United States Patent [19]

Biffar

[11] Patent Number: 6,047,269
[45] Date of Patent: Apr. 4, 2000

[54] SELF-CONTAINED PAYMENT SYSTEM WITH CIRCULATING DIGITAL VOUCHERS

[75] Inventor: Peter Biffar, 1060 High St., Palo Alto, Calif. 94301

[73] Assignee: Peter Biffar, Palo Alto, Calif.

[21] Appl. No.: 09/196,497

[22] Filed: Nov. 21, 1998

Related U.S. Application Data

[63] Continuation of application No. 08/684,218, Jul. 19, 1996.
[51] Int. Cl.[7] ..................................................... G06F 17/00
[52] U.S. Cl. .................................. 705/39; 705/26; 705/41
[58] Field of Search .................................. 705/39, 26, 41

[56] References Cited

U.S. PATENT DOCUMENTS

| | | | |
|---|---|---|---|
| 4,689,478 | 8/1987 | Hale et al. | 235/380 |
| 5,221,838 | 6/1993 | Gutman et al. | 235/379 |
| 5,550,358 | 8/1996 | Tait et al. | 235/380 |
| 5,671,280 | 9/1997 | Rosen | 380/24 |
| 5,710,887 | 1/1998 | Chelliah et al. | 705/26 |
| 5,745,886 | 4/1998 | Rosen | 705/39 |

FOREIGN PATENT DOCUMENTS

0720102A1  7/1996  European Pat. Off.  ........ G06F 17/00

*Primary Examiner*—Allen R. MacDonald
*Assistant Examiner*—Jagdish Patel
*Attorney, Agent, or Firm*—Michael A. Glenn

[57] ABSTRACT

A self-contained payment system uses circulating digital vouchers for the transfer of value. The system creates and transfers digital vouchers. A digital voucher has an identifying element and a dynamic log. The identifying element includes information such as the transferable value, a serial number and a digital signature. The dynamic log records the movement of the voucher through the system and accordingly grows over time. This allows the system operator to not only reconcile the vouchers before redeeming them, but also to recreate the history of movement of a voucher should an irregularity like a duplicate voucher be detected. These vouchers are used within a self-contained system including a large number of remote devices which are linked to a central system. The central system can e linked to an external system. The external system, as well as the a remote devices, are connected to the central system by any one or a combination of networks. The networks must be able to transport digital information, for example the internet, cellular networks, telecommunication networks, cable networks or proprietary networks. Vouchers can also be transferred from one remote device to another remote device. These remote devices can communicate through a number of methods with each other. For example, for a non-face-to-face transaction the internet is a choice, for a face-to-face or close proximity transactions tone signals or light signals are likely methods. In addition, at the time of a transaction a digital receipt can be created which will facilitate a fast replacement of vouchers stored in a lost remote device.

23 Claims, 8 Drawing Sheets

SELF-CONTAINED PAYMENT SYSTEM WITH CIRCULATING DIGITAL VOUCHERS

CROSS-REFERENCE TO RELATED APPLICATIONS

This is a continuation of application Ser. No. 08/684,218 filed Jul. 19, 1996.

BACKGROUND OF THE INVENTION

1. Technical Field

This invention relates to the general field of payment systems, and more particularly, to a self-contained payment system using digital vouchers for payments from individual to individual, individual to business, from business to individual and from business to business.

2. Description of the Prior Art

Today, there are a number of different payment systems in use allowing an individual or a business to make payment to another individual or business. The most common are paper bills and coins, debit and credit cards, checks, traveler checks and others. Newer forms, many still in field trial stage, are home banking, smart card based methods or on-line methods for the internet and intranets.

These payment systems are all sub optimal because they are limited in the scope of how and in what situations they can be used. Therefore, it is necessary today to use a range of payment systems in parallel:

Paper bills and coins are anonymous in use, can be used freely from individual to individual, individual to business, from business to individual and from business to business. However, they require a physical transfer, and micro payments of less than $0.01 are not possible, payments must be divisible by $0.01. If lost or stolen, paper bills and coins cannot be replaced.

Debit and credit cards protect the user against loss and fraud. However, the transactions are not anonymous and they can only be used to pay merchants who are registered with the appropriate debit or credit organization. In addition, small payments (less than $5) are generally not accepted.

Checks are practical to send a payment to another distant party. They also protect the user against loss. However, since they are a paper based system, they need to be physically transported to the recipient's bank which can be a multiple-step and time-consuming process. In addition, the funds are often not immediately available to the recipient, who might have to wait until the check cleared the bank. Check payments are not anonymous. Payments of less than $0.01 are not possible.

Home banking as a payment system replaces generally the physical check with an electronic check, shortening the time for the recipient to receive the funds. However, the other disadvantages with respect to checks remain. In addition, home banking requires a PC with a modem.

Smart card based systems. The smart card is used as a medium of storage for value. The cards act in conjunction with a reader to allow payment. Therefore, a physical contact needs to be established between the payer and the payee. There are a number of different underlying technological approaches:

One technology approach (such as the field trial by Mondex in the UK) is anonymous, modeled after the paper bill and coin system. Currency can freely and without restrictions be moved from individual to individual, individual to business from business to individual and from business to business. These systems so far do not work for internet transactions and payments of less than $0.01 are not possible, payments must be divisible by $0.01. If lost, the funds cannot be replaced.

Most other smart card approaches are mostly non-anonymous and are limited to a payment from an individual to a registered merchant, in addition the merchant can not use the funds immediately, the funds must first clear the banking system. (examples are the technologies behind field trials such as Visa Cash, MasterCard, Proton, EC-Card, American Express, Smart Cash). If lost they generally can not be replaced, the exception is the American Express system which is modeled after the traveler check business.

Internet systems (such as CyberCash, NetBill, First Virtual, DigiCash or Millicent) are all in an early development or field trial state. They plan to offer micro payment options (First Virtual and CyberCash about $1 as smallest transaction, others about 1 cent). However, all these systems are limited, they can only be used on the internet. There is no payment system which can work on the internet ("on-line") as well as "off-line". Furthermore, most approaches can only handle payments from an individual to a merchant, the exception being a planned system for Deutsche Bank in Germany by DigiCash which is expected to allow individual to individual payments. Questions of anonymity are mostly not resolved at this time. DigiCash, a Dutch company is offering an anonymous approach. Most US based systems in development (for example CyberCash, Millicent) are mostly not anonymous.

Therefore, from a user's point of view all payment systems in existence as well as in development have a range of shortcomings. An ideal payment system should fulfill the following criteria:

Same payment system can be used for on-line and off-line payments.

Payments can be made in an on-line environment such as the internet, private networks, telecommunication networks, etc., as well as in an off-line environment for face-to-face transactions. Funds can be freely transferred from on-line to off-line and back to on-line.

Payment system can be used universally: pay anyone and receive funds from anyone, person or business, anywhere in the world.

Payments can be made from an individual to a business, from a business to an individual, from business to business as well as from an individual to an individual. The payment system can also handle multiple currencies.

Payments are available without restrictions and delays once received.

Payments can be freely used as soon as they are received. Furthermore, the transportation of a payment in the case of a non-face to face transaction is nearly instantaneous regardless of the physical distance between the payer and payee Micro payments of less than $0.01 are possible, which is of value for future on-line usage based payment structures.

Privacy is guaranteed, yet the overall payment system is protected against illegal attempts to corrupt the system.

The system in anonymous, the privacy of the individual is protected. However, the system can recognize certain illegal transactions and the transaction history can be made transparent allowing the tracking of these illegal transactions. It is a policy issue not a technical issue to set the rules of revealing an individual's identity and transaction history.

Transportation of payments across the network is secure utilizing the latest encryption technologies.

Funds can be replaced when lost.

Integrity of national and international banking systems is guaranteed.

Irregularities in the payment system are detected and can not enter the banking system and therefore have no impact on the money supply of a country.

Receipts for payments are provided.

Multi-purpose use.

Payment system can in addition be used to handle other payment type programs such as loyalty programs (for example frequent flier programs) or benefit transfer programs (for example food stamps).

None of the payment systems in use today fulfills all or most of these criteria.

The payment system according to the invention fulfills the above criteria and is therefore superior to all conventional payment systems.

SUMMARY OF THE INVENTION

The present invention includes circulating digital vouchers with attached logs which contain a history of the transactions experienced by the voucher. This includes the creation and use of a digital voucher as the voucher circulates through the self-contained payment system. A digital voucher includes an identifying element made up of a series of identifying digits in an exclusive order. The voucher further includes a dynamic log having a series of log digits. Log digits are added whenever there is a transaction involving the voucher, thus recording the movement of the voucher through the system. This allows a system operator not only to reconcile the vouchers but also to recreate the movement of a voucher. By evaluating the histories of vouchers irregularities can be detected early and be traced to their likely source. This invention could best be compared to a piece of paper which can be redeemed for a liar bill. On this piece of paper, whenever it is handed to another person, information is written such as the date and the account number of the person. All information written on the piece of paper can be in an encrypted form, therefore it is kept disguised and therefore anonymous. However, if an irregularity is detected in the history, the information written on this piece of paper representing the value of the dollar bill, can be decrypted by authorized persons and the history can then be revealed including the identities of the persons through whose hands the piece of paper moved.

The payment system according to this invention is self-contained and may be linked to an external system. In the case of electronic cash, for example, the external system is an existing bank. An account number in the bank is converted into a confidential account number in a central system separate from the external system. Value is transferred into an account by creating a digital voucher representing the value in the bank. Simultaneously to the voucher being created, in a parallel transaction the actual dollar value is transferred into an escrow account in the bank. The voucher can now be freely "spent" within the payment system according to the invention. When the voucher is redeemed, the voucher is inactivated in the central system. During the redemption when the value of the voucher is presented to the bank, the account number in the central system of the person redeeming the voucher is translated back into the person's account number in the bank. This account is increased by the value of the voucher presented and the escrow account is decreased by the same value.

Vouchers according to this invention are used within a self-contained system including one or more remote devices and a central system. A large number of remote devices are linked to the central system. The central system can be linked to an external system. The external system as well as the remote devices are connected to the central system by any one or a combination of networks. The networks must be able to transport digital information such as, for example, the internet, cellular networks, telecommunication networks, cable networks or proprietary networks. For on-line transactions between the remote devices and the central system, the internet is a likely choice. To establish a link between the remote device and the central system, for example to download vouchers from the central system to the remote device for later off-line payments, the telecommunication networks as well as the internet are likely choices.

Vouchers can also be transferred from one remote device to another remote device. These remote devices can communicate through a number of methods with each other. For example, for a non-face-to-face transaction the internet is a choice, for a face-to-face or close proximity transactions tone signals or light signals are likely methods.

In addition, at the time of a transaction, a digital receipt can be created which will facilitate a fast replacement of vouchers stored in a lost remote device.

If the structure and method according to the invention is applied to electronic cash, the external system is today's banking and clearing house systems linked to the central system using the existing inter bank networks for signal transport. Therefore, the banking network is separated securely according to today's standards form the self-contained payment system which uses circulating digital vouchers and reconciles them before they can be redeemed for their dollar value in the external banking system.

New developments in encryption technology or the setting of new internet standards such as the envisioned SET (Secure Electronic Transactions) standard which seems to be supported by Visa, MasterCard, Microsoft, Netscape and others are to the advantage of the payment system according to the invention and can be easily integrated.

The structure and method according to the invention has numerous and significant advantages over all conventional payment systems.

The remote devices can be used in an on-line environment such as the internet, private networks, telecommunication networks, etc., as well as in an off-line environment such as a face-to-face transaction. Vouchers according to the invention can be freely transferred from on-line to off-line and back to on-line.

Vouchers, according to the invention, can be passed from remote device to remote device and therefore from an individual to a business, from a business to an individual, from business to business, as well as from an individual to an individual.

Vouchers, according to the invention, can be used without restrictions and delays as soon as they have been received.

There is no value limit to a voucher according to the invention, therefore macro and micro payments (less than 0.01) are possible.

The account numbers of the central system can be kept anonymous using a translation algorithm protected by encryption. Therefore, the system is anonymous and the privacy of the individual is protected. However, the logs of the vouchers according to the invention can be read by authorized persons to track irregularities and therefore to prevent and trace illegal acts such as counterfeiting. It is a policy issue for the operator of the payment system according to the invention, not a technical issue, to set the rules for revealing an individual's identity and transaction history.

The transport of vouchers according to the invention through any type of network is secure. With the help of the attached logs the source of irregularities (e.g. counterfeiting) is easily and quickly tracked. In addition, common encryption technologies, as well as digital signatures, can be applied to add another level of security when the vouchers are in transit.

The integrity of the external system, for example the world financial systems, is protected. A payment system according to the invention is separated from the external system. Within the payment system, vouchers are used which are reconciled before they can be redeemed in the external system.

A user can receive receipts.

If a remote device gets lost, with the help of the receipts, the vouchers having been stored in the remote device at the time of loss can be identified and therefore be replaced.

The payment system can handle different currencies.

The payment system according to the invention includes the capability of being used as a multiple purpose system, for example, to manage loyalty programs such as frequent flier miles programs and to add other information and data to a voucher at a time of transaction such as coupons.

BRIEF DESCRIPTION OF THE DRAWINGS

FIG. 1-B is a block diagram of a self-contained payment system according to the invention linked to an external system;

FIG. 1-C is a simplified flow chart illustrating the circulation of a digital voucher through a self-contained payment system according to the invention;

DETAILED DESCRIPTION OF THE INVENTION

Throughout the description, the terms voucher and digital voucher are used interchangeably. In addition, the term programmed device can be used for remote device.

Overview

Figure 1A:
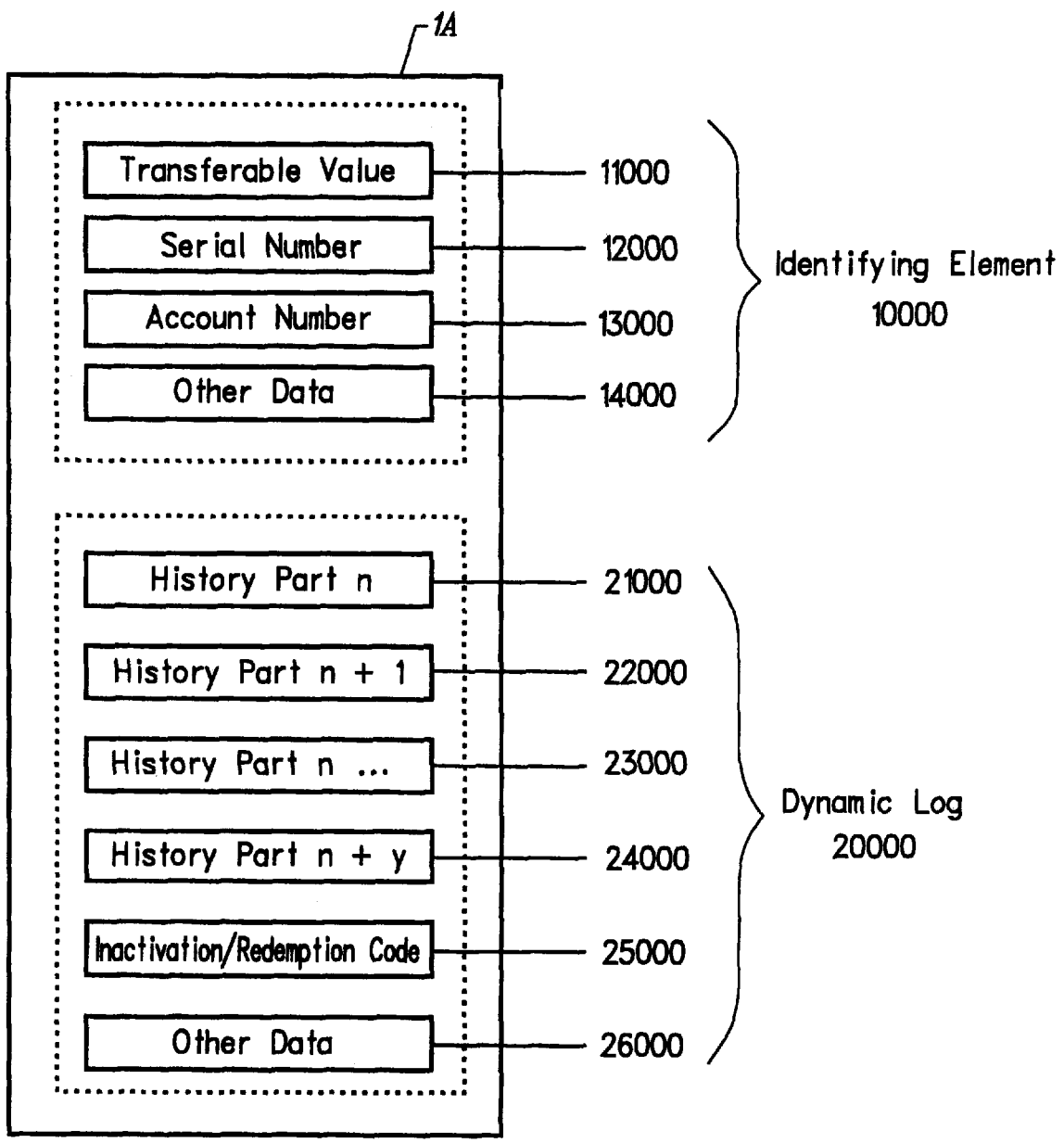
FIG. 1-A is a simplified block diagram of a digital voucher according to the invention.
Figure 1B:
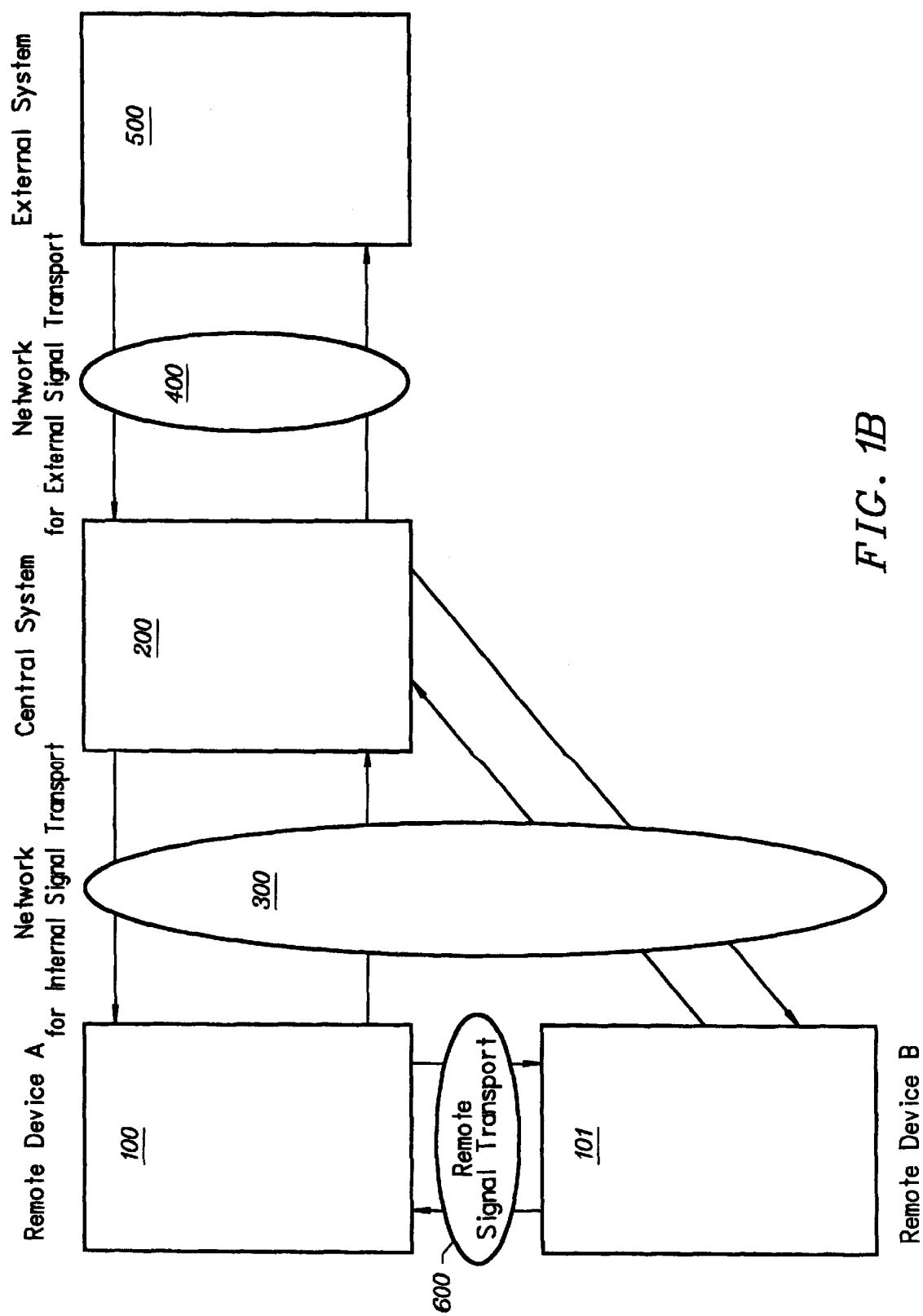
Figure 1C:
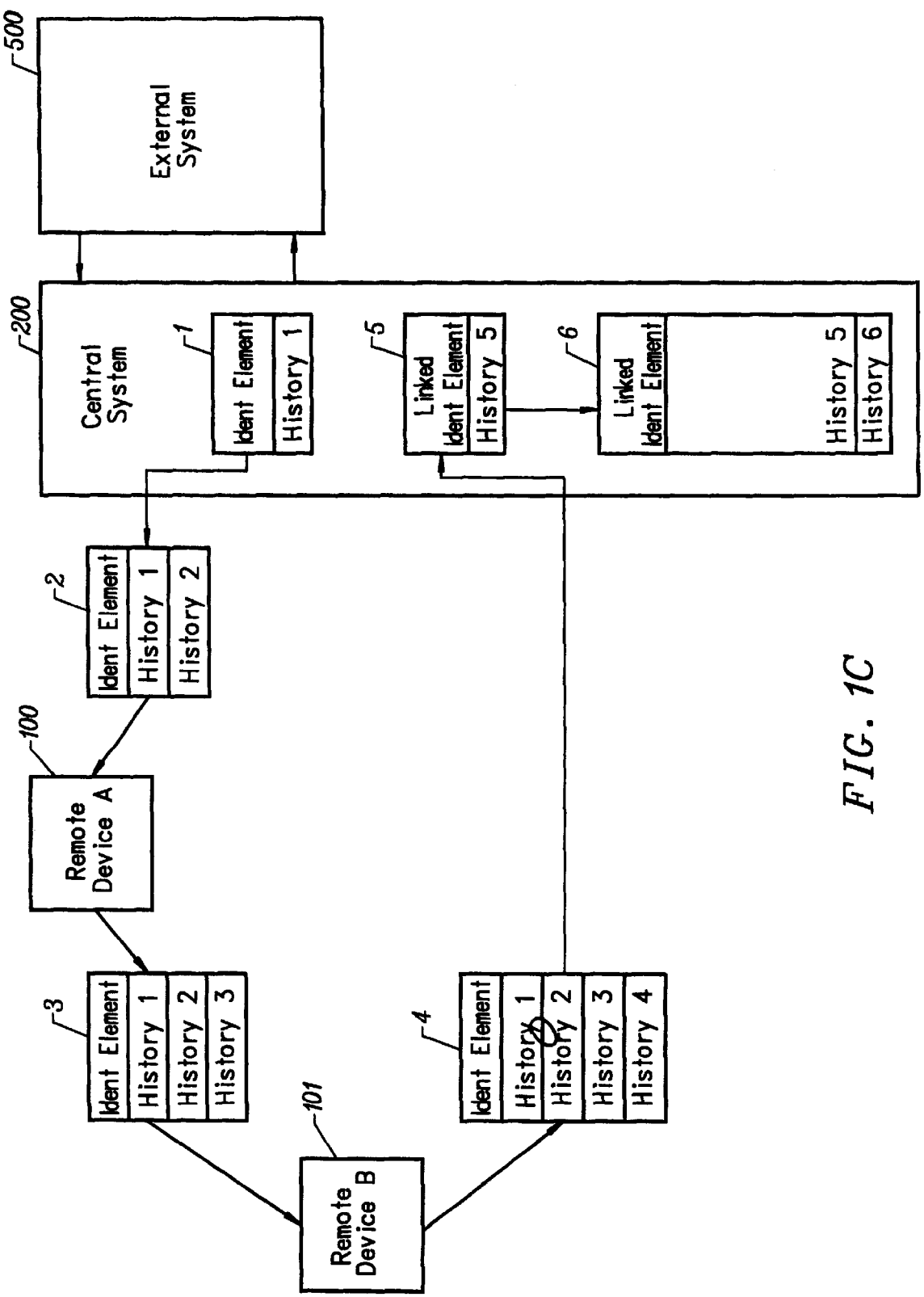

FIGS. 1-A to 1-C are simplified illustrations helping to provide an overview and explain key elements according to the invention. Additional details are described in FIGS. 2 to 6.

FIG. 1-A is a simplified block diagram of a digital voucher according to the invention. A digital voucher 1A consists, according to the invention, of an identifying element 10000 made up of identifying digits, and a dynamic log 20000 made up of log digits. The identifying element 10000 may include a set of digits representing a transferable value 11000 in an external system for which the voucher 1A can be redeemed, a unique serial number 12000, the account number 13000 which the voucher was created for, and any other data 14000, which could include a digital signature from the central system. This digital signature can be of any standard such as the SET (Secure Electronic Transactions) standard which is currently being developed by Visa, MasterCard, Netscape and others. The data of the dynamic log 20000 is increased whenever there is a transaction involving the voucher 1A, wherein a transaction includes a creation, any use including inactivation and redemption, or movement of the voucher 1A. The log digits contain data describing the history of the transactions, 21000,22000, 23000,24000,25000. These log digits can include a transaction code consisting of information such as the date and time of the transaction as well as the identification number of the device having performed the transaction. Other data 26000 not related to the creation, use or movement history of the voucher 1A may also be added. Therefore, when reading the data contained in the dynamic log of a voucher, the history of the creation, use and movement of the voucher 1A can be recreated. The identifying element 10000 and dynamic log 20000 can at any time be evaluated against a set of criteria to determine to which of several destinations the voucher will be transferred to in a next step. For example, prior to redeeming a voucher 1A, it can be checked that a voucher with the same serial number has not been redeemed before. If an irregularity appears, the history recorded in the dynamic log 20000 of all vouchers in question can be evaluated to trace the potential source of the irregularity.

FIG. 1-B is a block diagram of the self-contained payment system according to the present invention within which a voucher 1A (FIG. 1-A) is used. The system includes two major types of components, remote devices (programmed devices) such as remote device A 100 or remove device B 101 and a central system 200. A large number of remote devices such as remote device A 100 are linked to the central system 200. The linkage is through a network for internal signal transport 300. The central system 200 can, in addition, be linked to an external system 500. The external system 500 is connected to the central system by a network for external signal transport 400. Both the network for internal signal transport 300 and the network for external signal transport 400 must be able to transport digital information such as, for example, the internet, cellular networks, telecommunication networks, cable networks, TV networks, LANs or any other kind of computer network. If the payment system according to the invention is used for electronic cash, the external system 500 are today's banking and clearing house systems linked to the central system 200 using the existing inter bank networks and standards for external signal transport. This separates the banking networks securely from the payment system according to the invention. Two remote devices, such as remote device A 100 and remote device B 101 can be linked for remote signal transport 600 using one or a variety of technologies. For example, the internet, cellular networks, telecommunication networks, cable networks, TV network, LANs or any other kind of computer network can be used for non-face-to-face transactions between the two remote devices. For face-to-face, close proximity transactions, a direct physical contact such as a cable connection or an indirect contact using tone signals or light signals can be used.

FIG. 1-C is a simplified flow chart illustrating the circulation of a digital voucher through a self-contained payment system according to the invention. A voucher 1 is created by the central system 200 representing a transferable value in the external system 500. The creation of the voucher 1 includes the setting of the identifying element which does not change as the voucher is circulated as illustrated in this FIG. 1-C. This voucher 1 is placed into a user's A account in the central system 200. This is recorded in the dynamic log as history 1. User A can now transfer this voucher 1 into the user's remote device A 100. To the voucher 2, a second history, history 2 recording this transfer is added. As user A transfers the voucher 3 to a second user, user's B remote device B 101 a third history recording this transaction is added. The user B can either transfer the voucher to a third user C or as shown in the illustration of FIG. 1-C transfer the voucher to user's B account in the central system 200. The transfer of the voucher from user's B remote device to the central system is recorded as history 4 to the voucher 4. This voucher is now being evaluated to check that a voucher with the same serial number has not been redeemed earlier. If this voucher has not been redeemed before, this voucher is then inactivated and a linked new voucher is created which is stored in user's B account. This is recorded as history 5 to the new, linked voucher 5. User B can now redeem the voucher for its transferable value in the external system 500 as shown in the illustration of. FIG. 1-C. The redemption is recorded in the dynamic log as history 6. The redemption also ends the circulation of the voucher 6 through the payment system according to the invention.

Figure 2:
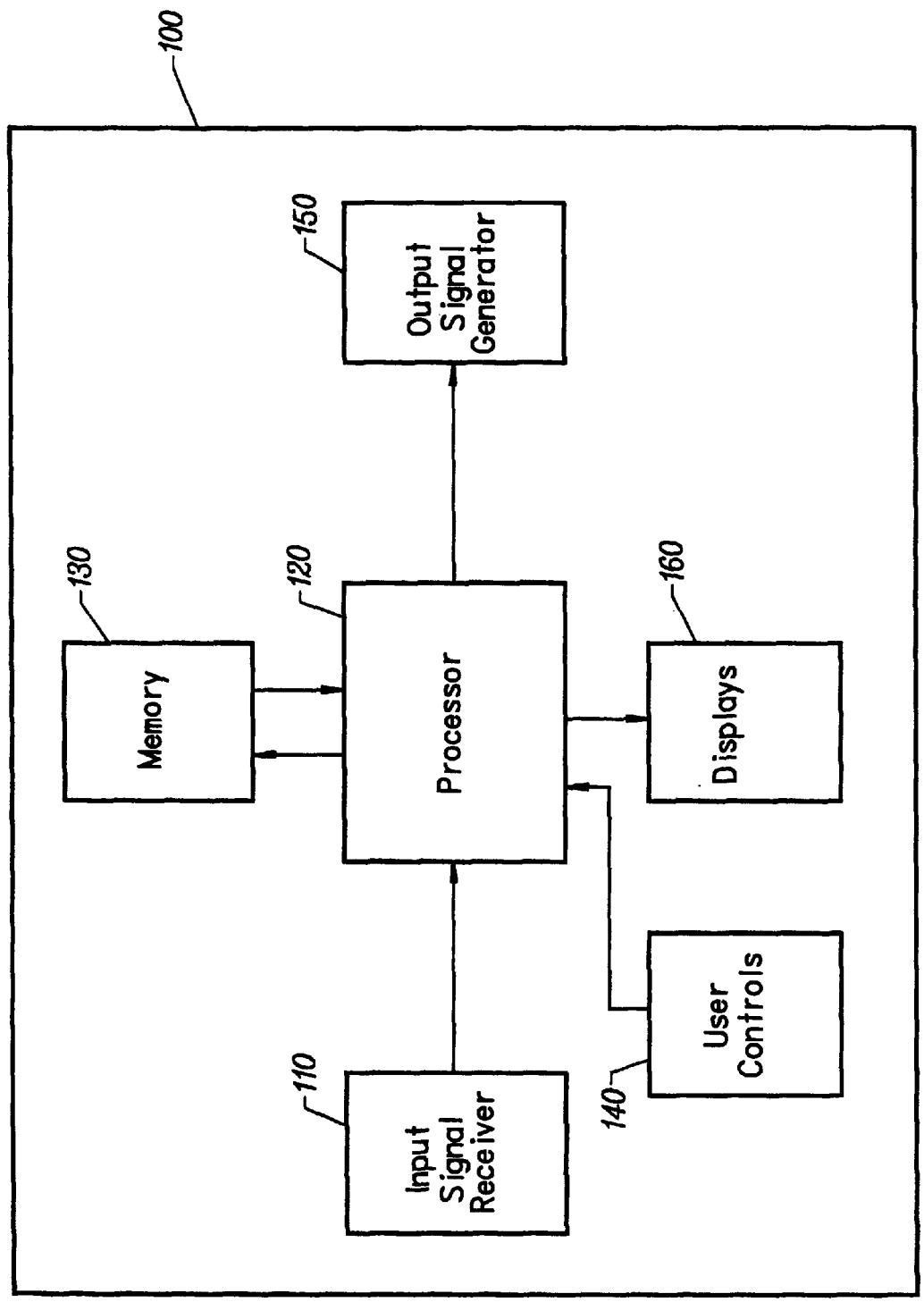
FIG. 2 is a block diagram of a remote device according to the invention.
Figure 3:
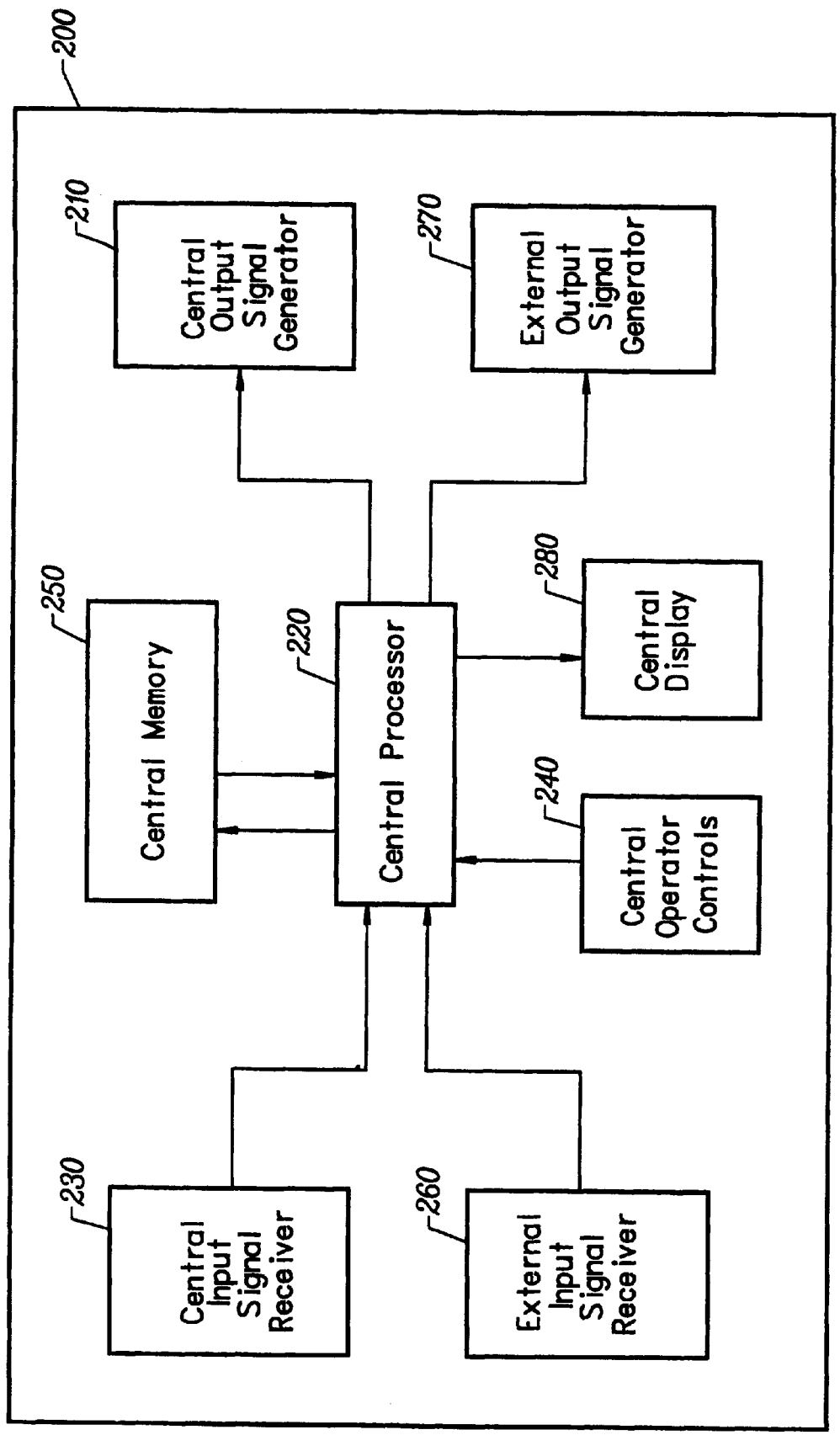
FIG. 3 is a block diagram of a central system according to the invention.
Figure 4:
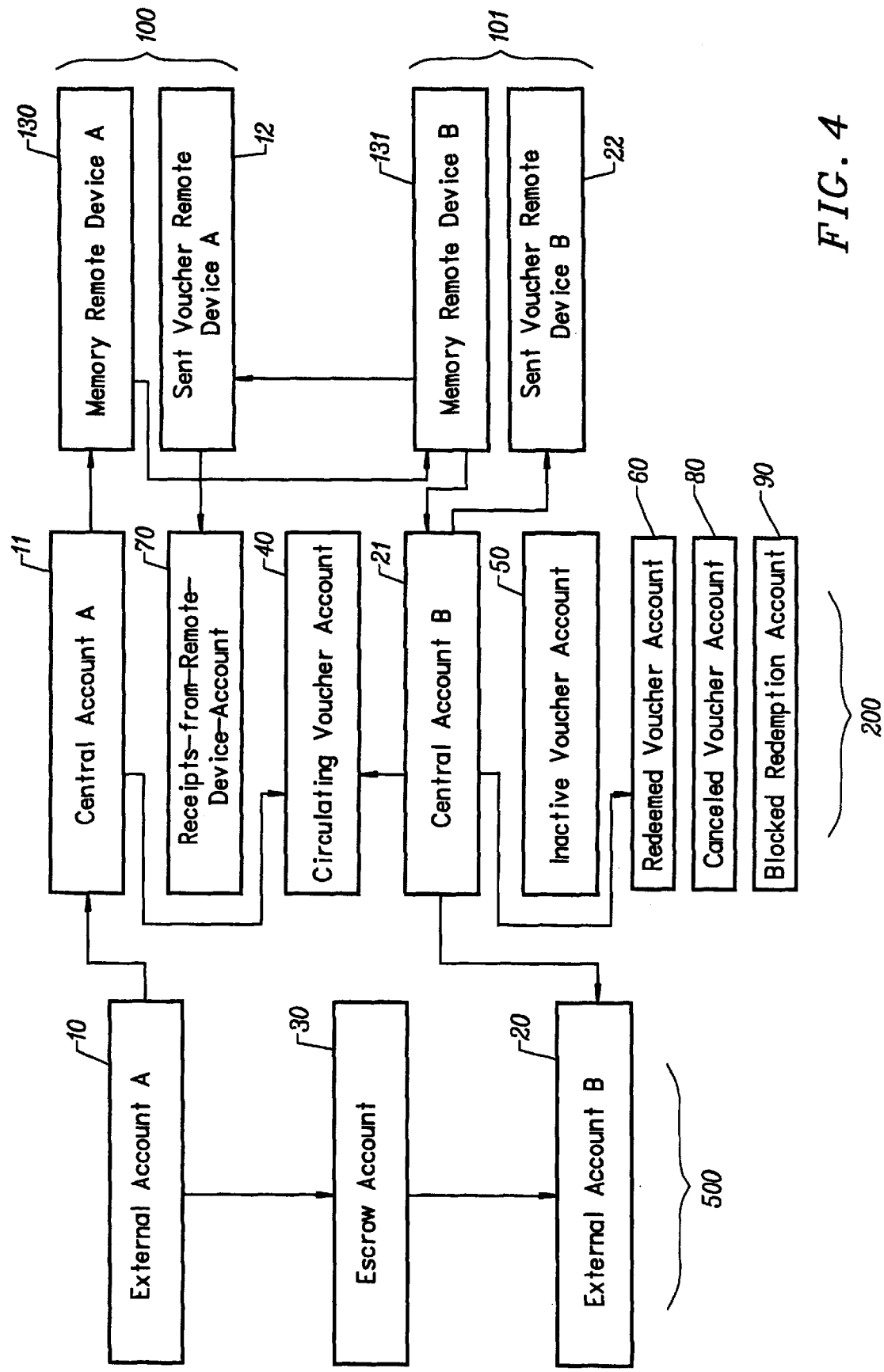
FIG. 4 is a flow chart showing the circulation of a digital voucher within a self-contained payment system linked to an external system, according to the invention.
Figure 5:
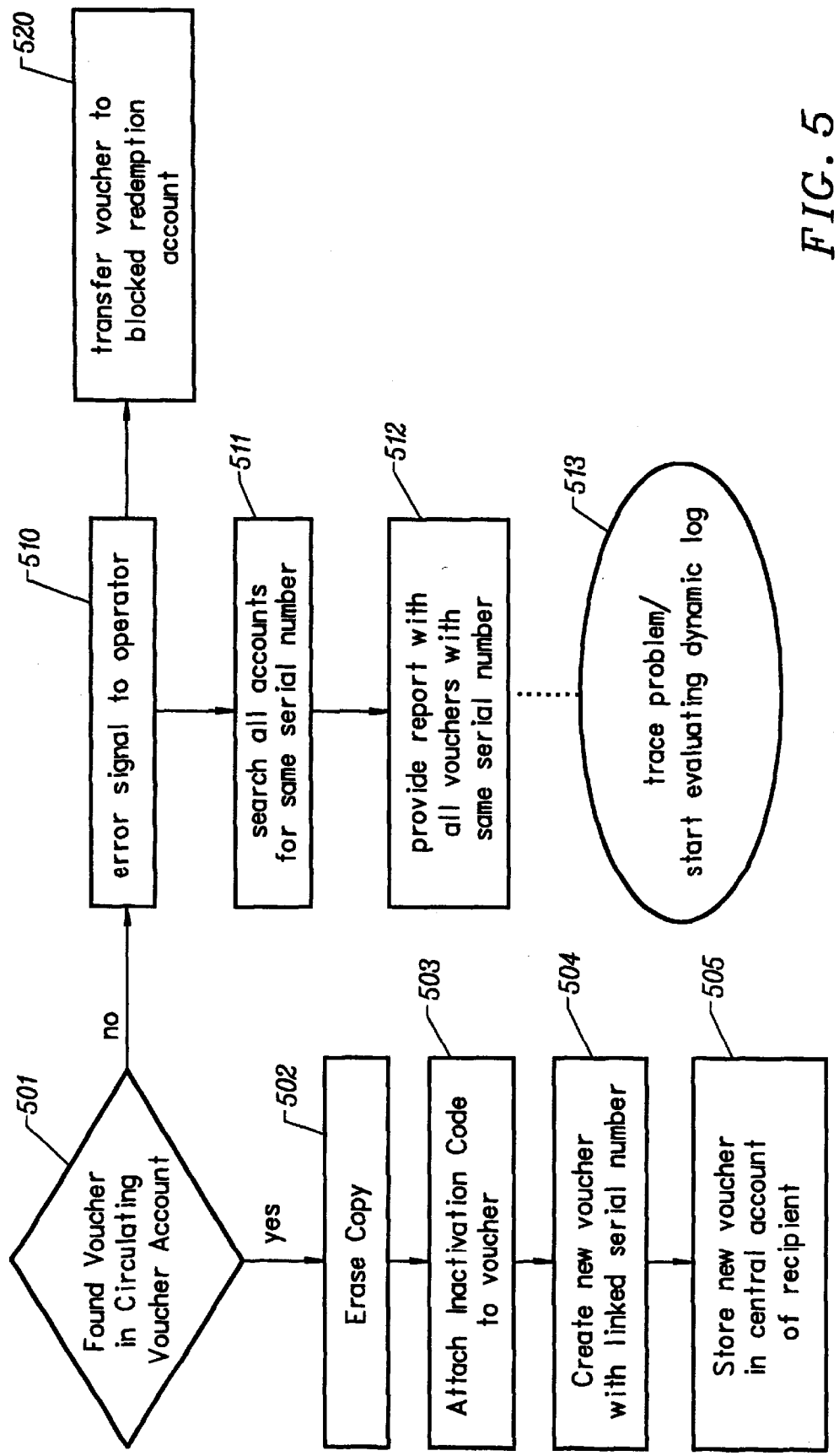
FIG. 5 is a flow chart showing the steps of evaluating the identifying digits and log digits to determine to which destination the voucher will be transferred to, according to the invention.
Figure 6:
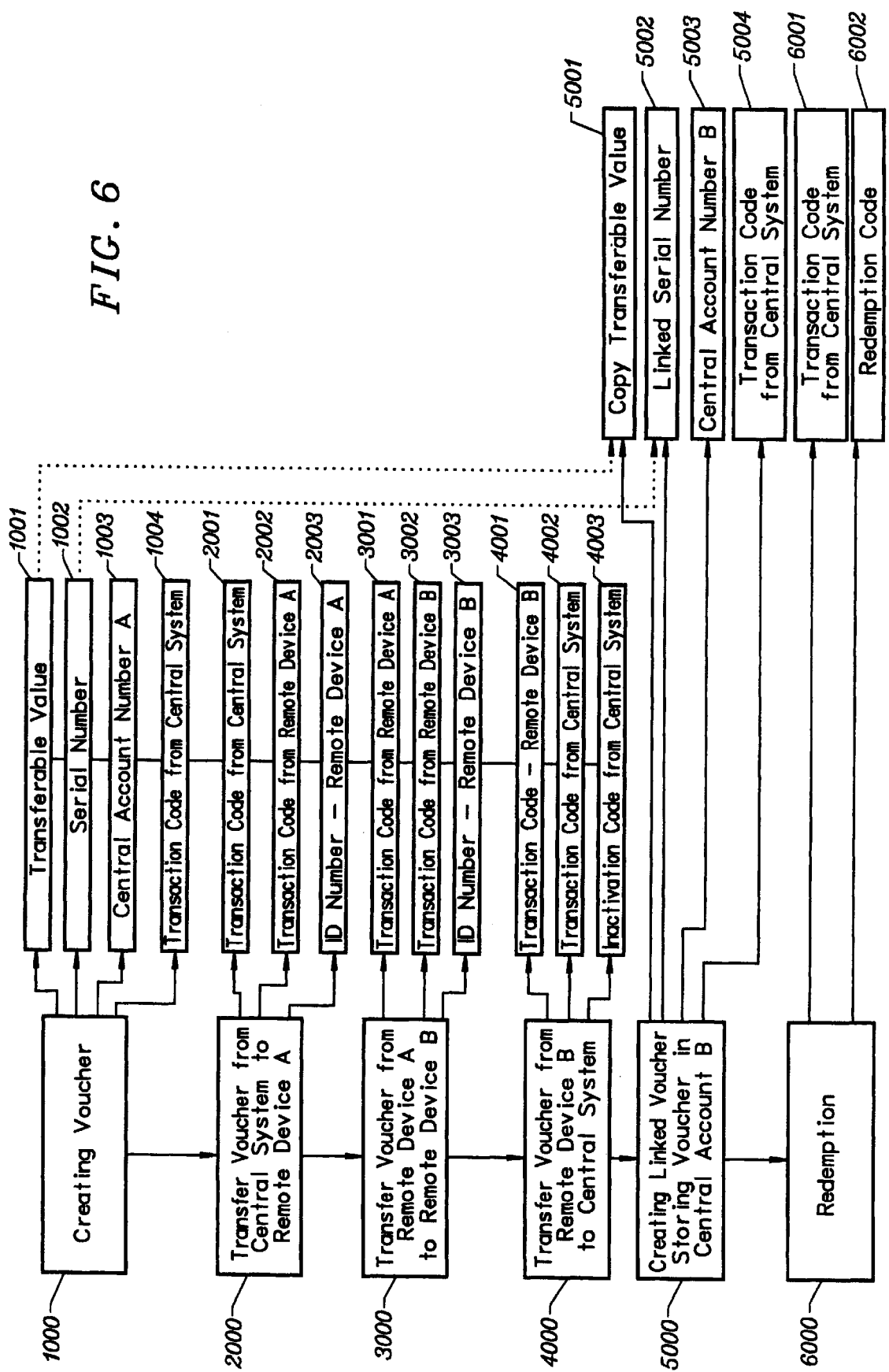
FIG. 6 is an illustration for setting an identifying element as well as setting and increasing a dynamic log of a digital voucher, according to the invention.

The following more detailed description begins with the description of a remote device (FIG. 2) and a central system (FIG. 3). This is followed by a step-by-step description of the circulation of a digital voucher within a self-contained payment system linked to an external system, according to the invention (FIG. 4). The steps of evaluating the identifying digits and log digits of a voucher to determine to which destination the voucher will be transferred to is also explained (FIG. 5). Thereafter the setting of an identifying element as well as the setting of and increasing a dynamic log of a digital voucher according to the invention is illustrated (FIG. 6). Thereafter, the creation and use of digital receipts is illustrated.

Remote Device (Programmed Device)

FIG. 2 is a block diagram of a remote device. The remote device A 100 (FIGS. 1-B and 1-C) includes an input signal receiver 110, a processor 120, a memory 130, an output signal generator 150, and user controls 140. The remote device may also include a display 160. The input signal receiver 110 receives the signals sent by the network for internal signal transport 300 (FIG. 1-B), or from a second remote device such as remote device B 101 (FIG. 1-B) through the remote signal transport 600 (FIG. 1-B), and sends these to the processor 120. The signals include digital vouchers as well as possibly operating instructions. The processor 120 stores in and retrieves from the memory 130 the vouchers received or to be sent out. The processor 120 furthermore generates and attaches the remote device's set of log digits to the dynamic log of a voucher whenever there is a transaction involving the voucher performed by the remote device. The memory stores in addition to vouchers, information such as the identification number of the remote device A 100 (FIG. 1-B), one or several account numbers of the user's central accounts in the central system, encryption keys, operating instructions and receipts of vouchers received. The processor 120 is linked to the output signal generator 150 which generates the appropriate signals for the network for internal signal transport 300 (FIG. 1-B) or for the remote signal transport 600 (FIG. 1-B). The processor 120 is activated by the user using the user controls 140 or by an incoming signal from another remote device or the central system 200 (FIG. 1-B). The user controls allow the user to instruct the remote device to establish contact with the central system 200 (FIG. 1-B), to request any type of transaction such as to create a voucher and place the voucher in the user's account in the central system or to transfer the voucher to the user's remote device. Furthermore, the user controls 140 can be used to establish a contact between two remote devices and to request any type of transaction. In addition, the user controls 140 can be used to input a PIN or password to establish the identity of the user. The display 160 which is linked to the processor 120 provides the user with feedback about the operation of the remote device. For example, the user can view the transaction the user requested, the amount of the transferable value of the voucher to be sent, or received, as well as review the transferable values of vouchers left in the memory, or review the receipts of transactions conducted previously.

The remote device (programmed device) is of great use to users when the device is in a small portable structure which can be easily carried in a pocket or purse.

A remote device such as remote device (programmed device) A 100 (FIG. 1-B) is of conventional electronic and computer components and can therefore be resident in other devices such as a computer, a phone, a cellular phone, a pager, a PDA, a TV or similar devices. The remote device thus could share the memory, processor and input and output signal generators of a computer. In addition, the remote device does not need to be in one physical embodiment or structure. It could reside in several. For example, the memory 130 can be in a smart card and the remaining components can reside in a computer which has the ability to interact with the smart card. Or all or part of the memory 130 could be located in the central system 200 (FIG. 1-B). Therefore, vouchers for example could only be stored in the central system whereas the account number of the central system, identification number of the remote device and encryption keys could be stored in the remote device. Furthermore, to allow a more versatile use, the remote device can have more than one input signal receiver 110 and more than one output signal generator 150.

Central System

FIG. 3 is a block diagram of a central system. The central system 200 (FIGS. 1-B, 1-C) includes a central output signal generator 210, a central processor 220, a central input signal receiver 230, a central operator controls 240, a central display 280, a central memory 250, an external input signal receiver 260, and an external output signal generator 270. The central system receives signals from the remote device through the central input signal receiver 230 which passes the data on to the central processor 220. The central processor 220 is linked to the central output signal generator 210 to send signals to a remote device such as remote device A 100 (FIG. 1-B). If the central system 200 (FIG. 1-B) is linked to an external system 500 (FIG. 1-B), it may have one or more additional external input signal receivers 260 to receive information from the external system 500 (FIG. 1-B). It also may have one or more additional external output signal generators 270 to send information to the external system 500 (FIG. 1-B). The central processor 220 is also linked to a central memory 250. The central memory 250 holds a large number of memory locations which represent accounts having account numbers. Each user has at least one central account such as central account A 11 (FIG. 4) in the central system 200 (FIG. 1-B). A user can store some or all of the user's vouchers in such a central account. The central memory 220 stores in addition to a user's central account such as central account A 11 (FIG. 4), data such as identification numbers of remote devices, encryption keys, circulating voucher account 40 (FIG. 4), inactive voucher account 50 (FIG. 4), redeemed voucher account 60 (FIG. 4), receipts-from-remote device account 70 (FIG. 4), cancelled voucher account 80 (FIG. 4), block redemption account 90 (FIG. 4) as well as other data and instructions needed for operations, for example. The central memory 250 is linked to the central processor 220. The central processor 220 performs a large number of functions. For example, the central processor 220 stores and retrieves vouchers, creates vouchers, assigns central account numbers to users, initializes remote devices by generating and transmitting identification numbers, sets identifying element of a voucher, adds log digits to the dynamic log of a voucher, evaluates identifying digits and log digits to for example, check for duplicate vouchers, allows or blocks redemption, inactivates vouchers, redeems vouchers, stores and tracks receipts, breaks large denomination vouchers into a number of smaller denomination vouchers, stores and summarizes other information attached to the vouchers, encrypts and decrypts incoming and outgoing signals, and checks the authentication of devices and external systems with which the central system communicates. As will be evident from the discussion below, there are a number of additional levels of complexity and functionality which can be added and which will further increase the number of functions performed by the central processor 220. If the central system 200 (FIG. 1-B) is linked to an external system 500 (FIG. 1-B) the central processor also manages the data in and out flow to the external system 500 (FIG. 1-B). The central system 200 (FIG. 1-B) is managed by an operator using the operator controls 240 which are likely a computer input terminal including a keyboard and a control display 280 such as a conventional computer screen.

The central system 200 (FIG. 1-B) can reside in a number of different devices such as computers which are linked and function together to perform as a central system.

Furthermore, whenever a voucher or other information is sent between a remote device and another remote device, or to and from the central system, the voucher to be sent could be encrypted using a variety of available encryption technologies. Similarly, once the encrypted voucher is received, it must be decrypted by the receiving remote device or central system.

In addition, remote devices as well as the central system could, once connected, also authenticate each other before continuing transactions. Whenever a remote device is connected to the central system or whenever the remote device is connected to another remote device, the device identification numbers are transmitted and checked against previously received and in memory stored information and commands to possibly restrict further transactions. This could also be done by using any of the common challenge-response methodologies.

The Circulation of a Digital Voucher Within a Self-Contained Payment System

FIG. 4 is a flow chart showing the circulation of a digital voucher within a self-contained payment system linked to an external system, according to the invention. For demonstration purposes, the illustration described below focuses on electronic cash. A user has a bank account such as an external account A 10 in the external system 500 (FIG. 1-B), whereas the external system is a bank. The central processor 220 (FIG. 3) of the central system 200 (FIG. 1-B) when instructed by the operator using the operator controls 240 (FIG. 3) sets up a unique account number for the central account 11 in the central memory 250 (FIG. 3). This account number is numerically linked to the account number of the external account 10. To do this, the central processor 220 (FIG. 3) could use the same account number of the external account A 10 as used in the external system. To keep the account number of the central account A 11 anonymous, the central system could disguise that number by using conventional encryption technologies such as a private and public key encryption methodology. The encrypted external account number of external account A 10 of the bank becomes the central account number of the central account A 11 in the central system 200 (FIG. 1-B). Therefore, the identity of the user in the central system 200 (FIG. 1-B) is disguised. However, by decrypting the central account number of the central account A 11, the external account number of the external account A 10 can be revealed and therefore the account holder A can be detected.

When using the remote device 100 (FIG. 1-B) for the first time, the device must be initialized by receiving an identification number from the central system 200 (FIG. 1-B). The identification number is numerically linked to the central account number of the central account A 11. To do this, for example, user A uses the user controls 140 (FIG. 2) of the remote device to establish a connection between the remote device 100 (FIG. 1-B) and the central system 200 (FIG. 1-B). User A then inputs the user's central account number of central account A 11 and the central system 200 (FIG. 1-B) creates an identification number for the remote device 100 (FIG. 1-B) and sends the identification number to the remote device 100 (FIG. 1-B). The remote device 100 (FIG. 1-B) stores the identification number in its memory.

How a connection is established depends on the technology used to send and receive signals from the remote device 100 (FIG. 1-B) to the central system 200 (FIG. 1-B) and similarly from one remote device to another one. The technology used also determines the specifications of the input signal receivers and output signal generators of the remote devices as well as the central system. For example, if the remote device resides in a PC which is using the internet to communicate with another remote device or the central system, then the input and output generators are conventional modems using the conventional protocols to communicate and establish a connection. If, for example, the network used is the telecommunication network, then standard DTMF or FSK tone generators on one end and tone decoders on the other end are used. In a face-to-face transaction, the two remote devices which are about to exchange a voucher can be brought in close proximity and send, as well as receive, for example, infrared signals.

A voucher is created when user A, using the remote device A 100 (FIG. 1-B), requests from the central system 200 (FIG. 1-B) to place a voucher with transferable value, for example of $5, into the central account A 11 and take the funds out of the external account A 10. The balance of the external account A 10 of user A is now being decreased by $5. The $5 are then being placed into an escrow account 30 at the external system 500 (FIG. 1-B), the bank. Simultaneously, the digit 5 representing the transferable value of the voucher is being sent by the external system 500 (FIG. 1-B) to the central system 200 (FIG. 1-B) and is being deposited in the central account A 11. Please note the setting the identifying element and the dynamic log as a voucher is created and travels through the payment system according to the invention is described in detail in FIG. 6. Now, when user A requests using the remote device A 100 (FIG. 1-B) that a voucher with value 5 is sent to the user's remote device A 100 (FIG. 1-B) user A also specifies the central account out of which to take the voucher. Alternatively, the remote device could be programmed as part of the setup to automatically put a user's central account number in unless prompted to do otherwise by the user. The central system 200 (FIG. 1-B) now takes the voucher out of the specified central account A 11, copies the voucher and places the copy in the circulating voucher account 40 at the central system 200 (FIG. 1-B). The central system 200 (FIG. 1-B) then transmits the voucher using central output signal generator 210 (FIG. 3) to the remote device A 100 (FIG. 1-B). Once received, the voucher is stored in the memory 130) (FIG. 2) of remote device A 100 (FIG. 1-B). Once this transaction is completed, the display 160 (FIG. 2) shows the user A confirmation.

Now user A wants to make a payment using remote device A 100 (FIG. 1-B) to user B with remote device B 101 (FIG. 1-B). User A uses the user controls 140 (FIG. 2) of the remote device A 100 (FIG. 1-B) to instruct the remote device A to establish contact with the other remote device B 101 (FIG. 1-B). User A then requests a transfer of a voucher with transferable value of 5 from the remote device A 100 (FIG. 1-B) to a second remote device B 101 (FIG. 1-B). The processor 120 (FIG. 2) takes the voucher out of memory 130 (FIG. 2) of remote device A (FIG. 1-B) and sends a signal including the voucher to remote device B 101 (FIG. 1-B), thus transferring the voucher to remote device B 101 (FIG. 1-B). The remote device B 101 (FIG. 1-B) in turn stores the voucher in its memory.

Now user B of remote device B 101 (FIG. 1-B) can transfer the voucher to another remote device. This would be the same transaction as described above. Technically a voucher can be transferred from a remote device to another remote device an infinite number of times without ever having to transfer the voucher back to the central system 200 (FIG. 1-B). However, from a security point of view it may be desirable to limit the number of times of transferring a voucher from a remote device to another remote device and thus "force" the voucher back into the central system in regular intervals. This has the advantage that a reconciliation of a voucher, as described below, will take place on a regular basis. The limitation of the movement of vouchers can be achieved in a variety of manners. For example the voucher could have an expiration date, or an internal counter to allow only a certain number of transfers, or a remote device could automatically download all vouchers received and not spent whenever a connection is established to the central system.

User B can also transfer the voucher using the remote device B 101 (FIG. 1-B) to the central account B 21 located in the central memory 250 (FIG. 3). User B uses the user controls 140 (FIG. 2) of the remote device B 101 (FIG. 1-B) to instruct the remote device B 101 (FIG. 1-B) to establish contact with the central system 200 (FIG. 1-B). User B then requests to transfer a voucher with transferable value of, for example from the remote device B 101 (FIG. 1-B) to the central system 200 (FIG. 1-B). The processor 120 (FIG. 2) of the remote device B 101 (FIG. 1-B) takes the voucher out of its memory, sends a signal including the voucher to central system 200 (FIG. 1-B), thus transferring the voucher to the central system. The evaluation and reconciliation which takes place before user's B account is credited is described in FIG. 5 below.

A variation on the circulation of a voucher within the self-contained payment system according to the invention as outlined above can be a payment system using remote devices which do not include a memory location to store vouchers. The vouchers are only stored in a user's central account in the central system such as in central account A 11. In this variation, when user A wants to transfer a voucher to another user B, user A must first establish a connection between user's A remote device A 100 (FIG. 1-B) and the central system (FIG. 1-B). User A then transmits user's A central account number, any authorization and, or authentication information if any, as well as any additional information with respect to the remote device which is necessary to be included in the dynamic log of the voucher when transferred to user B. This additional information could, for example include the identification number of the remote device used by user A. User A finally must also transmit information regarding the transferable value of the voucher to be transferred as well as user's B central account number for central account B to which the voucher is transferred to. Alternatively user B could establish a connection with user's B remote device and transmit the information regarding user's B central account number. The recording of the transactions in the dynamic log of a voucher is unchanged in this variation. If, as for example described above, user B does not use a remote device when receiving a voucher, then user's B central account number is included in the dynamic log instead of the identification number of user's B remote device. In this variation of the payment system the capability of the central system must be extended to include all necessary functions such as attaching a transaction code from the central system to the dynamic log of a voucher when the voucher is transferred between central accounts by the central system. Overall the creation, use and movement of vouchers is not changed in this variation of the payment system other than that the vouchers are not stored and accordingly transferred to and from memory locations residing within a remote device.

Evaluating the Identifying Digits and Log Digits

FIG. 5 is a flow chart showing the steps of evaluating the identifying digits and log digits to determine to which destination the voucher will be transferred to, according to the invention. When receiving a voucher the central processor 220 (FIG. 3) automatically searches the circulating-voucher-account 40 (FIG. 4) to find a voucher with the same subset of identifying digits, for example in this illustration the same serial number. Once the copy with the same serial number is found (step 501) in the circulating-voucher-account 40 (FIG. 4) the copy is erased (step 502) in that account. By finding the voucher in the circulating-voucher-account 40 (FIG. 4), the central system 200 (FIG. 1-B) is certain that the voucher has not been received before. A set of log digits representing the inactivation of the voucher is attached to the dynamic log (step 503) of the voucher. This inactivated voucher is then stored in a memory location called inactive-voucher-account 50 (FIG. 4) in the central memory 250 (FIG. 3) of the central system 200 (FIG. 1-B). The inactivated voucher is replaced by a newly created voucher of which the identifying digits are numerically linked (details refer to FIG. 6) to the inactivated voucher (step 504). This new voucher is then, to continue the example as discussed in FIG. 4 with user B having transferred a voucher to the central system, stored (step 505) in user's B central account B 21 (FIG. 4). User B can now either transfer this voucher to the user's remote device or redeem the voucher as is described below.

If a copy with the same serial number is not found (step 501) in the circulating-voucher-account 40 (FIG. 4) means that a voucher with the same serial number has been returned earlier which indicates a serious problem in that a duplicate of the voucher does exist in the payment system. An error signal for the system operator is automatically generated by the central system (step 510). Now the system searches (step 511) for the voucher or vouchers with the same serial number by reviewing the central memory of all user central accounts such as central account A 11 (FIG. 4) and central account B 21 (FIG. 4), the inactive-voucher-account 50 (FIG. 4), the canceled voucher account 80 (FIG. 4), the blocked redemption account 90 (FIG. 4) as well as the redeemed-voucher-account 60 (FIG. 4). Once the duplicate or duplicates are found a report with all vouchers with the same serial number is provided to the operator (step 512). Now the error source needs to be traced. By analyzing the dynamic log of the duplicate vouchers the point in time and device can be located from where the logs start to deviate (step 513). This is a good starting point to identify the remote device which likely sent the duplicate voucher. A good starting point for an investigation is provided, since the identification number of the remote device is linked to the corresponding central account number of the central account in the central system, and since the central account number in the central system is linked to the external account number of the external account in the external system, and further since the holder of the external account in the external system is known. If an encryption key was used to translate the external account number in the external system into the central account number in the central system then an encryption key is needed to reveal the identity of the account holder. There might be a policy on handling privacy issues in place or legal limitations on desiring to reveal the account holder. It is, however, critical to observe that the existence of a duplicate voucher is detected as well as the likely source. It is now an operations and policy issue how to handle this situation. One solution could be an insurance policy taken out by the operator of the central system to guarantee redemption to the users. In no event is an error carried from the payment system according to this invention to the external system such as the banking system in this illustration. The central processor 220 (FIG. 3) of the central system is programmed to automatically transfer (step 520) a voucher which could not be found in the circulating voucher account 40 (FIG. 4) to a blocked redemption account 90 (FIG. 4) which is located in the central memory 250 (FIG. 3). Vouchers in this account can not be redeemed without an operator interference.

To continue the illustration, user B who successfully deposited a voucher with a transferable value of 5 in the user's central account B 21 (FIG. 4) at the central system 200 (FIG. 1-B) now decides to redeem the voucher for its corresponding value of $5 in the external system 500 (FIG. 1-B). User B, using the remote device 101 (FIG. 1-B), requests from the central system 200 (FIG. 1-B) to transfer a voucher of value 5 from the user's central account B 21 (FIG. 4) of the central system (FIG. 1-B) to the corresponding external account B 20 (FIG. 4) of the external system 500 (FIG. 1-B) the bank account. The balance of the external account B 20 (FIG. 4) of user B is now being increased by $5 and the $5 are being taken out of the escrow account 30 (FIG. 4) of the external system 500 (FIG. 1-B). Simultaneously a set of log digits representing the redemption of the voucher is attached to the dynamic log of the voucher just redeemed. The voucher is then taken out of the central account B 21 (FIG. 4) and placed in the redeemed voucher account 60 (FIG. 4) of the central system 200 (FIG. 1-B).

When transferring a value between the external system 500 (FIG. 1-B) and central system 200 (FIG. 1-B) an additional step can be applied of translating the transferable value of a voucher in either direction using an external value exchange rate. This could be for example a currency exchange rate. Currencies from different external systems would be translated into one value of vouchers, such as each one US $ equals one unit of transferable value in the central system 200 (FIG. 1-B), whereas one German Mark equals 0.66 units of transferable value in the central system 200 (FIG. 1-B).

Vouchers are fixed in their transferable value, such as coins in our daily lives. When making a transaction the central processor 220 (FIG. 3) or the remote device such as remote device A 100 (FIG. 1-B) can assemble a series of vouchers which are in the aggregate of the value to be sent. When creating new vouchers a mix of vouchers of different values can be created adding up to the desired total value. This mix can be created by the central processor 220 (FIG. 3) which could be an overall optimized mix or a customized mix evaluating parameters such as current vouchers available and typical size of transactions. In addition if user A is left with only large value vouchers user A could request the central system 200 (FIG. 1-B), unless done automatically, to take a voucher out of central account A 11 (FIG. 4), inactivate the voucher, create a number of new smaller valued vouchers which add in total to the value of the inactivated voucher. The serial numbers, for example included in the identifying element of the newly created vouchers are linked to the serial number of the original now inactivated voucher thus the reconciliation and tracing abilities are not lost.

Setting Identifying Element and Increasing Dynamic Log of a Digital Voucher

FIG. 6 is an illustration for setting an identifying element as well as setting and increasing a dynamic log of a digital voucher, according to the invention. A digital voucher includes an identifying element made up of a series of identifying digits in an exclusive order. The voucher further includes a dynamic log having a series of log digits. These log digits increase whenever there is a transaction involving the voucher thus recording the transaction history or history of movement of the voucher through the system. This allows a system operator not only to reconcile the vouchers but also to recreate the movement of a voucher. By evaluating the histories of vouchers irregularities can be detected early and be traced to their likely source. This invention could best be compared to a piece of paper which can be redeemed for a dollar bill. On this piece of paper, whenever it is handed to another person, information is written such as the date and the account number of the person. All information written on the piece of paper can be in an encrypted form, therefore it is kept disguised and therefore anonymous. However, if an irregularity is detected the history, the information written on this piece of paper representing the value of the dollar bill, can be decrypted by authorized persons and the history can then be revealed including the identities of persons through whose hands the piece of paper moved.

A voucher is created (step 1000) by taking the digits representing the transferable value 1001 which is transferred from the external system 500 (FIG. 1-B) to the central system 200 (FIG. 1-B). The central system 200 (FIG. 1-B) attaches to this value 1001 an identifying element including information such as a serial number 1002 which has not been used throughout the system before, as well as the central account number 1003 of a central account for which the voucher was created for and into which the voucher is deposited such as the account number of central account A 11 (FIG. 4). In addition a digital signature can be added by the central system to the identifying element. The central system uses, for example a private key to create the signature. The remote device when receiving a voucher uses the corresponding public key to decrypt the digital signature included in the identifying element thus verifying that the voucher received was actually created by the central system. A digital signature is not included in the illustration of FIG. 6.

Furthermore, log digits representing a transaction code of the central system recording the creation of the voucher by the central system are attached 1004. This represents the first entry in the dynamic log. A transaction code can be a simple set of digits such as the time of the transaction or a sequential number increasing by 1 whenever a transaction takes place. Whereas time can be in the format of date or month, day, hour, second etc. or any understandable or machine readable format. A transaction code in general can also be a highly descriptive and complex code including a large volume of information such as time, description of type of transaction, digital signature, security code, identification and authorization codes and, or any other elements relating to a transaction.

When the above described voucher is transferred (step 2000) from the central system (FIG. 1-B) to the remote device A 100 (FIG. 1-B) of user A the central system attaches another transaction code 2001 to the dynamic log. The receiving remote device A 100 (FIG. 1-B) attaches its own transaction code 2002 to the dynamic log which again can be simple or complex as mentioned above. In addition the identification number 2003 of remote device A 100 (FIG. 1-B) is attached to the dynamic log.

When the voucher is now transferred (step 3000) from the remote device A of user A 100 (FIG. 1-B) to a second remote device B 101 (FIG. 1-B) of user B the remote device of user A attaches transaction code 3001 to the dynamic log. The remote device of user B 101 (FIG. 1-B) attaches its transaction code 3002 and its identification number 3003 to the dynamic log.

When the voucher is moved (step $000) by user B .o the central system 200 (FIG. 1-B) using the remote device B 101 (FIG. 1-B), this device attaches its transaction code 4001 to the dynamic log. The central system 200 (FIG. 1-B) attaches transaction code 4002 to the dynamic log, and once the matching serial number is found in the circulating voucher account an inactivation code 4003 is attached by the central system 200 (FIG. 1-B) to the dynamic log.

Immediately, nearly simultaneously a new linked voucher is created (step 5000). The identifying digits 5001 representing the transferable value remain unchanged by copying the transferable value 1001. A linked identifying element 5002 is also created. The link in the example of the serial number can be the old serial number expanded by dot-I (0.1). In addition the central account number B 21 (FIG. 4) 5003 of the user B into which account the voucher is now being placed is included in the identifying element. In addition the central system 200 (FIG. 1-B) attaches its transaction code 5004 to the dynamic log.

Now user B is redeeming the voucher (step 6000). The central system 200 (FIG. 1-B) attaches a transaction code 6001 as well as the redemption code 6002 to the dynamic log. The redemption code ends the circulation of a voucher.

The in above FIG. 6 described setting of the identifying element and the dynamic log of a voucher is an illustration. There are a variety of other methods available to setting the digits for the identifying element as well as the dynamic log. If there is an irregularity like a duplicate serial number or duplicate of a complete identifying element the two or more vouchers in question can be evaluated by, for example, comparing the dynamic logs. The transaction code after which the logs start to differ is the starting point for the analysis. In a next step the identification number of the remote device of the last common transaction is of interest since it is likely that that remote device has created the duplicate and sent it to more than one party. Now the identity of the user of that remote device can be revealed. If encryption was used, the identification number of the remote device is decrypted. This reveals the central account number of the central account of the user of the remote device in question. Once this account number is known it can also be decrypted if it was encrypted and the account number of the external account is thus revealed. The account holder of that external account is usually known us is the case if the external system is a bank. Therefore, once the account number in the external system is known the account holder can easily be identified by the operator of the external system.

The central processor 220 (FIG. 3) is programmed to block the transaction of redemption for a voucher once a duplicate serial number or duplicate of a complete identifying element is detected. Similarly the central processor 220 (FIG. 3) and or the remote device can be programmed to evaluate the identifying element and or dynamic log of all vouchers as they are received by the remote device or central system according to certain criteria which determine the next destination the voucher will be transferred to. Whereas destination can be an account or a transaction to be performed. For example there could be a lottery where the winner must have a certain sequence of digits to be found in the dynamic log. Once this sequence of digits is discovered the voucher with these digits is moved to a separate account or destination which in turn or in addition alerts the operator or the user of the event. Instead of searching for a certain lottery number the search could include a certain set of identification numbers or access numbers, or other particular sequences of digits representing for example, stolen devices or vouchers. If for example a remote device is stolen the operator of the central system can be alerted as soon as a voucher is returned to the central system showing a recent transaction with the stolen remote device's identification number. Again analyzing the dynamic log can help to trace the potential thief. In addition remote devices as well as the central system can, once connected, also authenticate each other before continuing transactions. Whenever a remote device is connected to the central system or whenever the remote device is connected to another remote device the device identification numbers are transmitted and checked against previously received and in memory stored information and commands to possibly restrict further transactions. Therefore once the identification number of a stolen device is known no other remote device, once aware of the problem will accept vouchers from the stolen device.

In addition to the history of transactions other log digits including other data could be attached to a voucher. For example when purchasing something a specialized merchant remote device could attach a receipt describing what has been purchased or attach loyalty bonus points. Once the voucher with this attached information is returned to the central system the system reads this information and stores it in a separate account or memory location. This expands the payment system to a multi purpose use system. In addition to payments other services such as the management of loyalty programs and personal finances can be offered. For example the merchant receipts could be formatted in a format as it is used in commercially available personal financial software packages. The data collected could be transferred via e-mail for example to the user on a regular basis or on-demand. Or the bonus points could be tracked in a separate bonus account, with monthly statements. Or the user could sell a copy of his receipts to a marketing research company.

Digital Receipts

In a further expansion a user's remote device will receive a digital receipt (also called simply receipt) each time a voucher is transferred from the user's remote device to another remote device or to the central system or received from the central system. These digital receipts are useful when a remote device is lost or stolen. In the case of loss or theft the vouchers contained in the lost remote device at the time of loss or theft can be identified to a large extent and in the case of loss be replaced. In the case of theft the digital receipts can further provide the central system operator with an early lead to possibly track the thief. These receipts include at least a portion of the identifying element of the voucher which was received, such as in the illustration below, the serial number. In addition the receipts include the identification number of the sending remote device or the sending central system followed by the identification number of the receiving remote device or the receiving central system. If the central system does not have an identification number then a code representing the central system is added. In addition the receipts include the time for example month, day, hour and second when the receipt was created, immediately after the transaction of transferring a voucher is completed. One copy of the receipt is stored in this illustration each by the receiving and sending remote device. Each remote device has a separate memory location called sent-voucher-remote-device such as sent-voucher-remote-device A 12 (FIG. 4). The display 160 (FIG. 2) can show the user a message indicating that the receipt has been received and therefore the transaction has been executed successfully. Furthermore each time a remote device such as remote device A 100 (FIG. 1-B) interacts with the central system 200 (FIG. 1-B) these receipts are automatically downloaded to the central system 200 (FIG. 1-B). There they are stored in a separate memory location called receipts-from-remote-device-account 70 (FIG. 4). When a voucher returns to the central system and is inactivated the receipts with, in this illustration, the same serial number are erased from receipts-from-remote-device account 70 (FIG. 4). (Note for each transaction a pair of receipts can exist, one from the sending and one from the receiving remote device.) If a receipt is received by the central system after the voucher is already inactivated the receipt is erased.

Now if a remote device is reported missing or stolen all receipts of vouchers received by the missing or stolen remote device with the identification number of the missing or stolen remote device attached which are in the receipts-from-remote-device-account 70 (FIG. 4) are found by the processor of the central system. As over time at least one of the pair of receipts is likely to be received by the central system the vouchers corresponding to these receipts represent the known maximum number of vouchers which could have been in the missing or stolen remote device at the time of the theft or loss. This is from hereon defined as maximum number of vouchers. Note that receipts of vouchers which the remote device either sent to the central system or which where transferred to another remote device and that remote device transferred the voucher back to the central system are not included (as is desired) in the maximum number of vouchers, since once these vouchers were returned to the central system the corresponding receipts were erased.

From this maximum number of vouchers the following must be subtracted to arrive at the vouchers residing in the remote device: a.) vouchers which have been transferred to other remote devices and the receipts of which were downloaded to the receipts-from-remote-device-account 70 (FIG. 4) of the central system 200 (FIG. 1-B). All receipts in the receipts-from-remote-device-account 70 (FIG. 4) for vouchers which were sent from the missing/stolen remote device to another remote device must be found by the central processor since the vouchers corresponding to these receipts clearly no longer reside in the missing/lost remote device. This can easily be done by the central processor searching for receipts with the identification number of the stolen/missing remote device showing that a voucher has been transferred. b.) vouchers which have been transferred to other remote devices, and the receipts of which were not downloaded to the receipts-from-remote-device-account 70 (FIG. 4) of the central system 200 (FIG. 1-B). This is the case when, for example the lost remote device A passed on a voucher to remote device B before the loss, and the remote device A is lost before it has a chance to transmit its copy of the receipt to the central unit, and when the receiving remote device B has not yet established a connection with the central system to download its copy of the receipt. Generally if remote device B is in regular use the time span between connections between the remote device B and the central system is short. Therefore, in general the central system will receive all receipts in a short period of time and thus can rather quickly arrive at an estimate which vouchers have been in the stolen/lost device at the time of loss or theft. All of the above subtracted from the "maximum number of vouchers" is defined as "estimated vouchers in the remote device".

Theoretically above mentioned remote device B could become inactive over a long period of time. Therefore, from a practical point of view the central system operator could set up rules such as to inactivate (let expire) vouchers if they have not been returned to the central system by a certain time, or allow the storage in a remote device for only a limited time, after which the voucher is inactivated.

As a precaution and in the case of theft all "estimated vouchers in the remote device" can be canceled. The canceled vouchers are stored in a separate memory location called canceled-voucher-account 80 (FIG. 4). The cancellation also means that the voucher is taken out of the circulating voucher account 40 (FIG. 4). Whenever a voucher is returned and not found in the circulating voucher account this canceled-voucher-account must also be checked. Now when a canceled voucher is returned to the central system it must be determined by analyzing the date and time included in the transaction code in the dynamic log whether the return is "legitimate" meaning that the stolen or missing remote device transferred the voucher to another remote device before the remote device was reported stolen or lost. If the voucher is "legitimate" the voucher is taken out of the canceled voucher account 80 (FIG. 4) and is replaced with a new voucher with in this illustration, a serial number which i5 linked by a set of identifying digits to the canceled voucher to keep a historic trail. If the voucher is "illegitimate" the log of the canceled voucher provides a possible trail to the thief. In addition in either event the maximum number of vouchers is reduced by the returned voucher.

Finally, since over time it is possible to identify vouchers which are lost or stolen but not returned for redemption, the system operator can decide to replace these vouchers. In addition when a theft occurs more aggressive, proactive steps can be undertaken such as to transmit to remote devices the identifying elements of the vouchers stolen or likely stolen to prevent the acceptance of such a voucher by a remote device without prior checking with the system operator.

In case of a report of theft the central processor will immediately search for receipts or inactivated vouchers which show a time stamp, therefore activity, with a time after the time of theft of the stolen remote device. This offers the system operator a good lead to search for the thief.

The receipt can in addition to the above outlined information also include any other information such as details about the item or service purchased, or any promotional message or coupon or any other information.

It should be noted that receipts are a useful tool as illustrated above to, for example gain a quick insight into transactions and might also be required by regulations concerning financial transactions. However, the complete history can be recorded in the dynamic log and therefore receipts might not be necessary.

Advantages of Self-Contained Payment System With Circulating Digital Vouchers The structure and method according to the invention has numerous and significant advantages over all conventional payment systems.

- the remote devices can be used in an on-line environment such as the internet. private networks, telecommunication networks etc. as well as in an off-line environment such as a face-to-face transaction. Vouchers according to the invention can be freely transferred from on-line to off-line and back to on-line.
- vouchers according to the invention can be passed from remote device to remote device and therefore from an individual to a business, from a business to an individual, from business to business as well as from an individual to an individual.
- vouchers according to the invention can be used without restrictions and delays as soon as they have been received.
- there is no value limit to a voucher according to the invention therefore macro and micro payments (less than $0.01) are possible.
- the account numbers of the central system can be kept anonymous using a translation algorithm protected by encryption. Therefore the system is anonymous, and the privacy of the individual is protected. However, the logs of the vouchers according to the invention can be read by authorized persons to track irregularities and therefore to prevent and trace illegal acts such as counterfeiting. It is a policy issue for the operator of the payment system according to the invention, not a technical issue, to set the rules for revealing an individual's identity and transaction history.
- the transport of vouchers according to the invention through any type of network is secure. With the help of the attached logs the source of irregularities (e.g. counterfeiting) is easily and quickly tracked. In addition, common encryption technologies, as well as digital signatures, can be applied to add another level of security when the vouchers are in transit.
- the integrity of the external system, the world financial systems is protected. A payment system according to the invention is separated from the external system. Within the payment system vouchers are used which are reconciled before they can be redeemed in the external system.
- a user can receive receipts.
- if a remote device gets lost, with the help of the receipts, the vouchers having been stored in the remote device at the time of loss can be identified and therefore be replaced.
- the payment system can handle different currencies.
- the payment system according to the invention includes the capability of being used as a multiple purpose system, for example, to manage loyalty programs such as frequent flier miles programs and to add other information and data to a voucher at a time of transaction such as coupons.

While the invention has been described with regards to specific embodiments and specifications, those skilled in the art will recognize that changes can be made in form and detail without departing from the spirit and scope of the invention.

I claim:

1. A method for creating and using a digital voucher, comprising the steps of:
    setting an identifying element having a series of identifying digits which include an exclusive order of digits, wherein said identifying element includes a pattern of digits representing a serial number that is unique to said voucher;
    setting a dynamic log having a series of log digits; increasing the data in said dynamic log whenever there is a transaction involving the voucher, wherein a transaction includes creation, any use or movement of the voucher; and
    wherein said log digits contain data related to a history of transactions.

2. The method of claim 1, wherein the method further comprises the step of:
    evaluating said identifying element and dynamic log of the voucher with respect to evaluation criteria which after evaluation determines to which one of several possible destinations the voucher will be transferred.

3. The method of claim 2, wherein said step of evaluating said identifying element and dynamic log is a reconciliation before said voucher is allowed to be redeemed for said transferred value.

4. The method of claim 1, wherein said identifying element includes a pattern of digits representing a transferable value in an external system for which the voucher can be redeemed.

5. The method of claim 4,
    wherein the attachment of a particular pattern of digits in said dynamic log provides that said voucher is inactivated creating an inactivated voucher and transforming the transferable value of said voucher from an initial value to a value having no transferable value and creating a second series of vouchers having transferable values in smaller denominations than the original voucher;
    wherein said second series of smaller vouchers are linked to said original voucher through a series of identifying digits in the identifying elements of said second series of smaller vouchers wherein the total value of said smaller denominated vouchers equals the initial transferable value of said inactivated voucher.

6. The method of claim 1, wherein said log digits include a time of each transaction recorded.

7. The method of claim 1, wherein the step of increasing the data in said dynamic log includes attaching an identification number of a device performing a transaction.

8. The method of claim 1, wherein said log digits include data in addition to the history of transactions for said voucher.

9. A digital voucher system comprising:
an identifying element having a series of identifying digits which include an exclusive order of digits, wherein said identifying element includes a pattern of digits representing a serial number that is unique to said voucher;
a dynamic log having a series of log digits which together with said identifying element comprise a voucher data set; and
a set of instructions for a processor to add data to said series of log digits whenever there is a transaction involving the voucher, wherein a transaction includes a creation of as well as any use of or movement of the voucher,
wherein said dynamic log contains data related to a history of transactions.

10. The system of claim 9, wherein said set of instructions for said processor includes instructions to evaluate said identifying digits and log digits of said voucher with respect to evaluation criteria, the evaluation determines to which one of several possible destinations the voucher will be transferred.

11. The system of claim 9, wherein said identifying element includes a pattern of digits representing a transferable value in an external system for which the voucher can be redeemed.

12. The system of claim 11, wherein said set of instructions for said processor further includes instructions to evaluate said identifying digits and log digits to perform a reconciliation before said voucher is allowed to be redeemed for said transferable value.

13. The method of claim 11,
wherein said set of instructions for said processor includes instructions to attach a particular pattern of digits to said dynamic log providing that said voucher is inactivated creating an inactivated voucher and transforming the transferable value of said voucher from an initial value to a value having no transferable value and creating a second series of vouchers having transferable values in smaller denominations than the original voucher;
wherein said second series of smaller vouchers are linked to said original voucher through a series of identifying digits in the identifying elements of said second series of smaller vouchers wherein the total value of said smaller denominated vouchers equals the initial transferable value of said inactivated voucher.

14. The system of claim 9, wherein said log digits include a time of each transaction.

15. The system of claim 9, wherein said set of instructions for said processor increasing the data in said dynamic log includes attaching an identification number of a device when performing a transaction.

16. The system of claim 9, wherein said log digits include data in addition to the history of transactions for said voucher.

17. A system for executing transactions, comprising:
a voucher, comprising:
an identifying element, wherein said identifying element includes a pattern of digits representing a serial number that is unique to said voucher; and
a dynamic log to which additional data representing the transfer of the voucher is added whenever there is a transaction involving the voucher and
a computer for executing a transaction, wherein said transaction includes creation of, use of, or movement of the voucher.

18. The system of claim 17, further comprising:
a remote device comprising:
an input signal receiver for receiving said vouchers sent to the said remote device;
a memory for storing said vouchers and storing an identification number of said remote device and storing an account number;
an output signal generator for sending said vouchers; and
a processor for storing said received vouchers in said memory, wherein said processor generates and attaches a remote device set of log digits to said voucher, and wherein said processor retrieves vouchers from said memory and sends them to said output signal generator linked to said processor.

19. The system of claim 17, further comprising:
a central system comprising the following components:
a central memory where memory locations represent accounts having account numbers, vouchers are stored in said accounts, the memory is connected to a central processor;
a central processor which:
provides user with an account number in the central system and which allocates space in said central memory for said account number;
creates said identifying element of said voucher;
attaches a central system identifying set of log digits when performing a transaction;
transmits said voucher to a first remote device;
receives said voucher from a second remote device, where said first remote device and said second remote device can be the same remote device;
evaluates said identifying digits and log digits of said received voucher; and
redeems said voucher only after verifying that said voucher has not been received earlier in said central system;
a central input signal receiver which receives said vouchers from any of said first and second remote device and which is linked to said central processor; and
a central output signal generator which is linked to said central processor and sends said vouchers to any of said first and second remote device.

20. The system of either claim 18 or claim 19, wherein said log digits comprise any of:
an identification number, time/date information, a serial number, loyalty bonus points, a transaction receipt, a transaction coupon, a sweepstakes transaction, a lottery transaction, or a transaction bill.

21. The system of claim 20, wherein said log digits are stored in a separate account which is optionally remotely located.

22. The system of claim 20, wherein said log digits are stored in an application specific format.

23. The system of claim 22, wherein said log digits are transferred to said application.

* * * * *